United States Patent [19]

Luckey

[11] 4,126,973
[45] Nov. 28, 1978

[54] RAFTER VENT

[76] Inventor: William A. Luckey, P.O. Box 31275, El Paso, Tex. 79931

[21] Appl. No.: 687,409

[22] Filed: May 17, 1976

Related U.S. Application Data

[62] Division of Ser. No. 589,356, Jun. 23, 1975, Pat. No. 4,007,672.

[51] Int. Cl.² .................... F24F 7/00; E04B 7/02
[52] U.S. Cl. ............................. 52/91; 52/94; 52/198; 52/698; 98/37
[58] Field of Search .......................... 52/90–94, 52/198, 303, 698, 702, 715; 98/DIG. 6, 37

[56] References Cited

U.S. PATENT DOCUMENTS

| | | | |
|---|---|---|---|
| 1,651,071 | 11/1927 | Scheppers | 160/327 |
| 2,200,031 | 5/1940 | Lee | 98/42 |
| 2,302,194 | 11/1942 | Dayton | 403/217 |
| 2,513,056 | 6/1950 | Scallon | 98/29 |
| 2,883,946 | 4/1959 | Van Kleef | 52/95 |
| 2,885,942 | 5/1959 | Hirst | 98/37 |
| 2,936,692 | 5/1960 | White | 98/32 |
| 2,954,727 | 10/1960 | Katt et al. | 98/33 |
| 2,969,726 | 1/1961 | Bottom | 98/37 |
| 2,990,590 | 7/1961 | Graveley | 52/94 X |
| 2,991,709 | 7/1961 | Haddix | 98/42 |
| 3,018,713 | 1/1962 | Anderson | 98/37 |
| 3,051,071 | 8/1962 | Leigh | 98/37 |
| 3,108,828 | 10/1963 | Kus | 403/399 X |
| 3,125,942 | 3/1964 | Smith | 98/37 |
| 3,174,421 | 3/1965 | Gray | 98/37 |
| 3,256,654 | 6/1966 | Pinckney, Jr. | 52/95 |
| 3,290,077 | 12/1966 | La Barge | 52/753 C X |
| 3,331,180 | 7/1967 | Vissing et al. | 52/715 X |
| 3,333,875 | 8/1967 | Tracy | 52/92 |
| 3,360,892 | 1/1968 | Rosso | 52/93 |
| 3,373,676 | 3/1968 | Dunnington et al. | 98/37 |
| 3,777,649 | 12/1973 | Luckey | 52/94 X |

Primary Examiner—Alfred C. Perham
Attorney, Agent, or Firm—David M. Ostfeld

[57] ABSTRACT

An improved prefabricated apparatus used for occupying the space between the rafters, and bounded by the roofing material and the finish material on the outer walls of a building, the size of such space being dependent upon the vertical dimension of the rafter supporting the roofing material and the horizontal distance between rafters. The apparatus is provided with telescoping flexible snap-fit shoulders so that it may be adjusted for variations in the nominal (standard) spacing of rafters and rafter warpage. The apparatus is also provided with a tongue so that it may be adjusted to various rafter pitches and/or variations from the nominal (standard) rafter depth.

8 Claims, 5 Drawing Figures

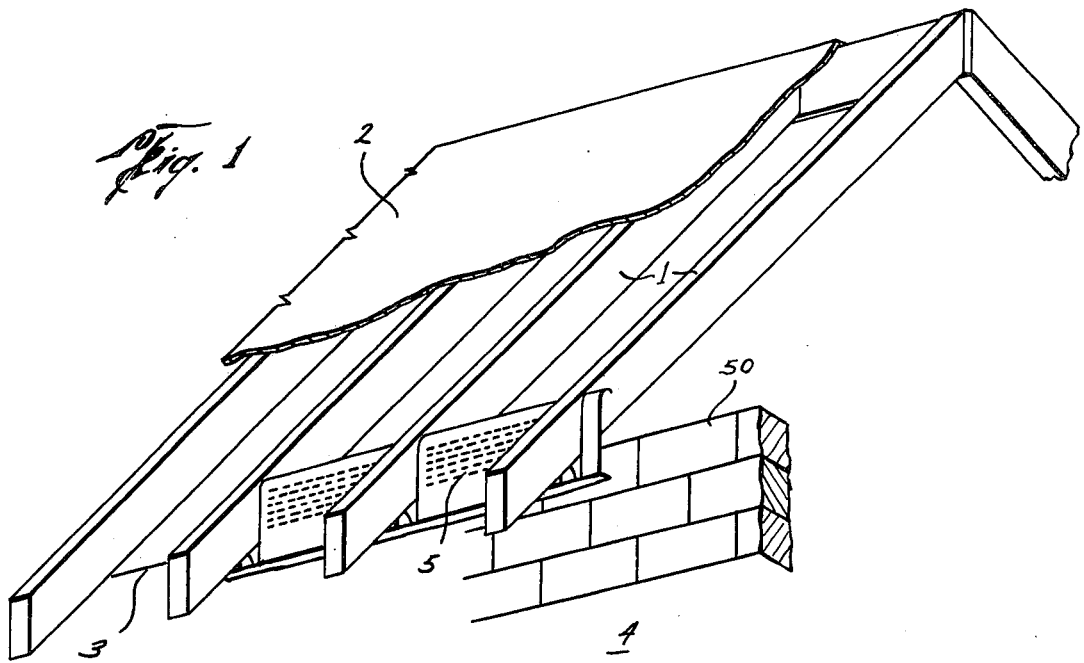
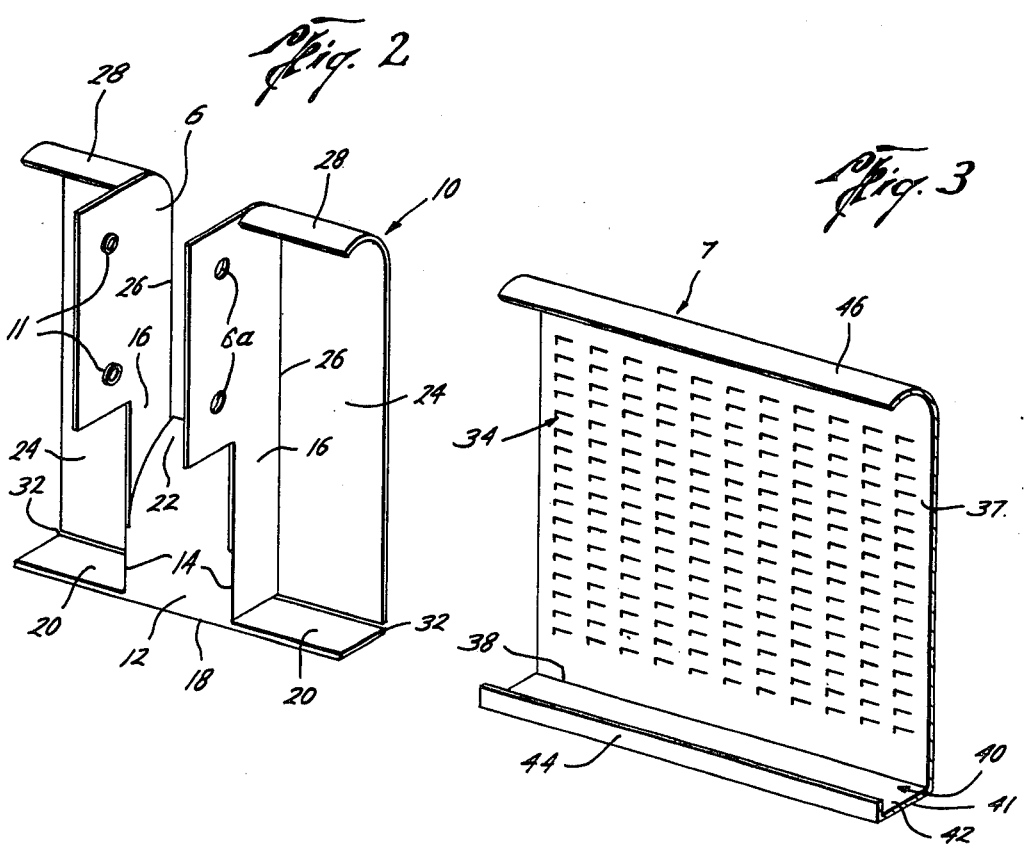

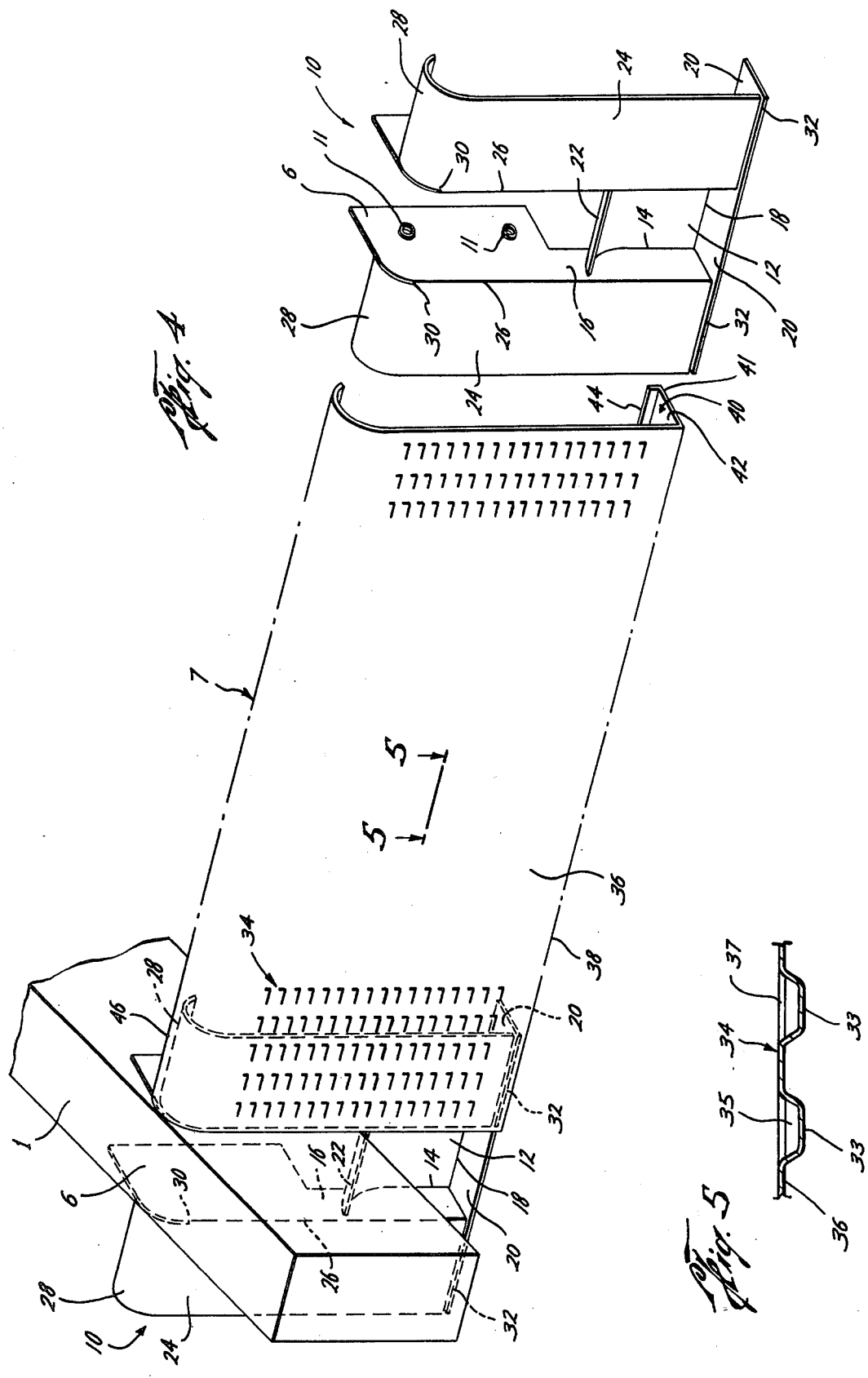

RAFTER VENT

This is a division of application Ser. No. 589,356, filed June 23, 1975 now U.S. Pat. No. 4,007,672.

BACKGROUND OF THE INVENTION

1. Field of the Invention

This invention relates to frieze vents for buildings.

2. Description of the Prior Art

It has long been the practice that in order to seal the space between the roofing material and outside walls of a building, bounded on the end by rafters, a so-called frieze board would be constructed by carefully measuring the spaces between the rafters, cutting notches in a long board to fit around the rafters and nailing the boards in place. Vent holes are sometimes provided, which holes may be covered with screen wire. This method of construction and installation of a frieze board has been an arduous and time consuming task.

Various devices have been used in the prior art to avoid the use of the above described method of construction and installation. Typical examples in the prior art are U.S. Pat. No. 1,651,071, issued Nov. 29, 1927 to J. C. Scheppers; U.S. Pat. No. 2,969,726, issued Jan. 31, 1961 to T. J. Bottom; U.S. Pat. No. 3,125,942, issued Mar. 24, 1964 to L. L. Smith; U.S. Pat. No. 3,256,654, issued June 21, 1966 to E. D. Pinckney, Jr.; U.S. Pat. No. 2,991,709, issued July 11, 1961 to D. D. Haddix; U.S. Pat. No. 3,051,071, issued Aug. 28, 1962 to R. L. Leigh; and U.S. Pat. No. 3,777,649, issued Dec. 11, 1973 to W. A. Luckey.

The Smith, Pinckney, Haddix and Leigh devices all disclose ventilator modules used in installations wherein the vents are parallel with the ground. Additionally, they do not disclose devices for convenient fittings about rafters.

The Scheppers and Bottom devices disclose the expedient of ventilators installed between adjacent rafters and outside walls in a full or partially vertical position but fail to disclose means for enclosing the space under the rafters securely nor do they disclose a method of solidly locking the screening material with the rafter connectors in a convenient slide and snap connection manner after the rafter connectors have been installed.

The Luckey device discloses the expedient of a prefabricated apparatus for occupying the space between the roofing material and the outer walls of a building bounded by two adjacent rafters but does not use a vent system terminating evenly with the building wall nor a rafter connector equipped to enclose a rafter and engage adjacent vents on either side of the rafter. The unit is also expensive to construct.

The problems of having a prefabricated, easily installed structure capable of compensating for variable distance rafter spacings and warpage is solved by the rafter vent of this invention. The vent can be prefabricated because it is adjustable to variations in the normal size of the space between the rafters and the warpage of the rafters, as well as providing a rafter connection unit for two adjacent vent screens.

SUMMARY OF THE INVENTION

The present invention is a prefabricated sheet of metal, plastic or other material which is used to occupy the space between the roofing material and the finished material on the outside walls of a building in combination with a rafter connector. This space is caused by the vertical dimension of the rafters which raised the roofing material above the outside walls.

Preferably, the rafter vent is fabricated in a number of sizes designed to conform to various dimensions and spacing of the rafters, and it is provided with means for adjusting its dimensions to accomodate variations in the normal sizes of the openings and warpage of the rafters. It is perforated, if desired, to a degree to allow ventilation of the attic space enclosed but at the same time to exclude the entry of birds and large insects. The invention is provided with a rafter bracket per rafter, preferably including ears and a tongue in order that the rafter vent may be easily installed by connection to the rafters.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein:

FIG. 1 is a perspective view of a building using the preferred embodiment of the rafter vent device of the present invention showing two vents installed.

FIG. 2 is a back perspective view of the rafter bracket of the preferred embodiment of the rafter vent device of the present invention.

FIG. 3 is a back perspective view partially in hidden line of the vent of the preferred embodiment of the rafter vent device of the present invention.

FIG. 4 is a partially exploded, partially assembled front perspective view of two rafter brackets with a vent therebetween of the preferred embodiment of the rafter vent device of the present invention.

FIG. 5 is a top, cross sectional view of the vent of the preferred embodiment of the rafter vent, taken along section lines 5—5 of FIG. 4.

DETAILED DESCRIPTION OF THE PREFERRED EMBODIMENT

FIG. 1 shows a building structure having rafters 1 supporting roofing materials 2. Because of the vertical dimensions of the rafters, openings 3 are formed between the roofing material 2 and the outer walls 4 of the building. The rafter vent 5 of this invention is used to cover that opening and is held in place by attaching ears 6 (See FIG. 2) to rafters 1.

The assembled rafter bracket 5 is usually assembled (See FIG. 4) as a combination of three parts, two rafter brackets 10 (See FIG. 2) and one vent 7 (See FIG. 3).

Referring now to FIG. 2, a back perspective view of the rafter bracket 10 of the rafter vent 5 shows ears 6 used to attach rafter vent 5 to rafters 1, as by means of nails, for which holes 6a may be provided. Additionally, holes 6a may be provided with burrs 11 for driving into rafter 1 as a temporary means to hold the rafter bracket 6 in place until it can be nailed or otherwise secured. Burrs 11 are not necessary if, for example, an air driven staple gun or similar securing mechanism is used. Tongue 12 is connected at 14 to sides 16 of ears 6. The lower edge 18 of tongue 12 is connected to base 20. Tongue 12 and base 20 may be a single piece of metal, or alternately connections 14 and the connection at lower edge 18 may be by welding, soldering or other suitable connection process. The upper portion 22 of tongue 12 is free above connection 14 for resilient bending, and is arcuately curved back over the base 20. Ears 6 are also connected to shoulder supports 24 by creases 26 either as a continuous piece of metal or by welding or other suitable connection process. The top 28 of each of shoulder supports 24 of rafter bracket 10 is curved over the base 20 and is free above the termination 30 (See FIG. 4) of crease 26 to bend resiliently. The bottom space 32 between base 20 and the bottom edge of shoulder supports 24 provides additional resiliency. Space 32 may also be eliminated and shoulder support 24 and base 20 connected by welding or other suitable connection process. Base 20 forms the bottom closure insert to bottom channel 40, for vent 7. (See FIG. 3). Base 20, as previously noted, may be connected to the rest of rafter bracket 10 by being a part of a continuous piece of stamped metal, welding, or other suitable connection process.

FIG. 3 illustrates the details of the mid-section of the rafter vent 5. This section consists of vent slits 34 spaced in the front section 36 (See FIG. 4) of vent 7. The lower portion 38 of the front 36 is folded behind front section 36 to form channel 40 having base 42 and turned edge 44 at the rear of vent 7. Channel 40 is of a suitable width to permit close fit of base 20 between front face 36 and edge 44 over base 42. Rolled top 46 of front face 36 forms a half cylindrical surface folded behind front section 36 to the back of vent 7 with approximately the same radius of curvature as rolled shoulders 28. This permits rolled top 46 to snap onto and fit snugly over rolled shoulders 28 of adjacent rafter brackets 10. Slits 34 are formed (See FIG. 5) by pressing protrusions 33 forward from back 37 to form a vented irregular front surface 36. Slits 34 are sized to prevent entry of birds and larger insects into the attic space.

Referring now to FIG. 4, the front partially exploded and partially assembled version of the rafter brackets 10 and vent section 7 illustrates the method of assembly of the pieces to form a rafter vent 5. Normally the procedure for installing rafter vents is to install adjacent rafter brackets 10 to rafters 1 by means of burrs 11 connected with holes 6a. The brackets 10 are located so that the lower edge of the brackets fit against the upper portion of the wall covering material, e.g., bricks 50. Thus the wall covering material may be terminated slightly below the bottom of the rafters, and the brackets and vents will cover any gap which may be left, such as between the top course of bricks 50 and the bottom of the rafters 1. This is an aid to brick masons, since it provides a tolerance so the final course does not have to terminate at the bottom of the rafter 1.

A hammer is used against ears 6 to force burrs 11 into rafters 1. Rafters 1 come down between the two ears 6 and lay on the top 22 of tongue 12 which has enough resiliency to bend down to adjust to any pitch of the roof. Additionally, because of the short length of crease 14 of tongue 12 with ears 6, problems of warpage or other distortion of rafters 1 may be avoided. Rafter brackets 10 are then secured in place to rafters 1 by nails (not shown) driven through holes 6a. Rafter brackets 10 therefore form a connection for the vent 7 with rafters 1 as well as cooperating with vent 7 to make a continuous straight surface behind which the exterior surfacing material of side 4 may be neatly terminated.

After adjacent rafter brackets 10 have been secured, vent section 7 is installed by sliding base 20 into channel 40 on each side of vent 7. Usually vent 7 is tilted out of the vertical plane so that channel 40 can engage the bases 20 on each adjacent rafter bracket 10. Then vent 7 is pushed toward the vertical plane so that rolled top 46 can snap over and engage adjacent rolled shoulders 28 on rafter bracket 10 thereby completing installation.

Standard widths and heights may be provided for both vent 7 and rafter bracket 10. Examples of these standards would be widths for 16 and 24 inch rafter spacings and heights standard for rafters 2×4 through 2×12 inches. Because of the ability of vent 7 to fit anywhere along rolled shoulder 28, variations of rafter spacing for standard widths and heights, either wider or narrower may be accommodated without trimming vent 7, as well as closing of openings between rafters that are out of plumb (due to warpage) without trimming vent 7.

It is also, of course, obvious that individual vents 7 may not include vent slots 34 but may in fact be solid just to close opening 3.

The components 7 and 10 of rafter vent 5 of this invention may have its parts readily stamped from a single flat sheet of aluminum or other metal sheet material and cut and bent into the shapes described for components 7 and 10, or it may be molded from various materials.

Although the device as described in detail supra has been found to be most satisfactory and preferred, different applications and many variations in its elements and the structure of its elements are, of course, possible. For example, non-standard sizes of the vent bracket 10 and vent 7 may be made using a hack saw and tin snips or otherwise stamping out the non-standard sizes. Also rafter vent brackets for inside and outside corners as needed for hip roofs, valleys and other variations may be easily formed by modifying rafter bracket 10. Moreover plastic, metal or other suitable material may be used in construction.

The above are, of course, merely exemplary of the possible changes or variations.

Because many varying and different embodiments may be made within the scope of the inventive concept herein taught, and because many modifications may be made in the embodiments herein detailed in accordance with the descriptive requirements of the law, it should be understood that the details herein are to be interpreted as illustrative and not in a limiting sense.

What is claimed as invention is:

1. A unitary body rafter connector for engagement to a building rafter, the rafter having sides, and engagement to at least one filler, the filler for closing space formed between the rafter and adjacent rafters comprising:
   a body;
   a resilient tongue having a width at least as wide as such rafter;
   connecting means for attachment of said body to both of such sides of such rafter;
   locking means for fastening said body to such fillers.

2. A rafter connector for engagement to building rafters having sides, comprising:
   a resilient tongue having a width at least as wide as such rafter; and
   connecting means for attachment to such sides of such rafter;
   locking means for engaging other structures; and
   wherein said resilient tongue includes two sides, said connector means is located on each of said sides and said locking means is provided on each of said sides.

3. A rafter connector according to claim 2 wherein each of said locking means includes a resilient rolled top shoulder and a plate.

4. A rafter connector according to claim 3 wherein said plate is mounted facing said resilient tongue.

5. A rafter connector according to claim 3 further including a base, said base being mounted under said plates and attached under said tongue.

6. A rafter connector according to claim 5 wherein said plates are attached to said base.

7. A rafter connector according to claim 5 wherein such building has a wall and said base extends below such rafters to cover the upper edge of such wall.

8. A unitary body rafter connector for engagement to a pitched building rafter, such rafter having sides and a bottom, and engagement to fillers for closing space formed between the rafter and adjacent rafters, comprising:
  a body;
  means on said body for connecting said body to such sides and bottom while compensating for such pitch of such rafter; and
  means for fastening said body to such fillers.

* * * * *